United States Patent Office 3,654,370
Patented Apr. 4, 1972

3,654,370
PROCESS FOR PREPARING POLYOXYALKYLENE POLYAMINES
Ernest L. Yeakey, Austin, Tex., assignor to Jefferson Chemical Company, Inc., Houston, Tex.
No Drawing. Continuation-in-part of application Ser. No. 602,167, Dec. 16, 1966. This application Aug. 28, 1970, Ser. No. 67,970
Int. Cl. C07c 85/06
U.S. Cl. 260—584 B
8 Claims

ABSTRACT OF THE DISCLOSURE

Polyoxyalkylene polyamines having the formula:

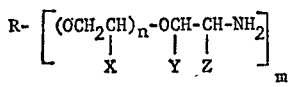

are prepared by treating the corresponding polyoxyalkylene polyols with ammonia and hydrogen over a catalyst prepared by the reduction of a mixture of the oxides of nickel, copper and chromium. These polyamines are useful as curing agents for epoxy resins, as plasticizers, as cross-linking agents or binders for textiles and as an intermediates in the preparation of polyureas. The polyoxyalkylene polyols may be obtained by the addition of one or more alkylene oxides to an aliphatic polyhydric alcohol.

CROSS REFERENCE TO RELATED APPLICATION

This application is a continuation-in-part of copending patent application Ser. No. 602,167 filed Dec. 16, 1966 now abandoned.

BACKGROUND OF THE INVENTION

This invention is concerned with the preparation of polyoxyalkylene polyamines by the reductive amination of polyoxyalkylene polyols over a nickel, copper, chromium catalyst.

In U.S. Pat. 3,236,895 there are described polyoxyalkylenediamines derived from polyoxyalkylene glycols. These diamines were prepared by reaction of ammonia with certain esters of the corresponding polyoxyalkylene glycols or by treatment of the corresponding polyoxyalkylene glycols with ammonia and hydrogen in the presence of a Raney nickel catalyst. Both procedures of U.S. Pat. 3,236,895 suffer from a disadvantage of look yields. This is a particularly serious disadvantage when higher molecular weight polyoxyalkylene glycols are employed, since there is no practical way to remove unreacted glycol from the desired diamine.

SUMMARY OF THE INVENTION

I have now discovered a method whereby polyoxyalkylenediamines and higher polyamines are obtained in good yield from the corresponding polyoxyalkylene polyols. In accordance with our procedure, a polyoxyalkylene polyol having the formula:

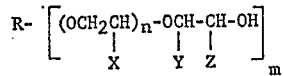

wherein R is the nucleus of an oxyalkylation-susceptible aliphatic polyhydric alcohol containing 2–12 carbon atoms and 2–8 hydroxyl groups, Z is an alkyl group containing 1–18 carbon atoms, X and Y are hydrogen or Z, $n$ has an average value of 0–50 and $m$ is an integer of 2–8 corresponding to the number of hydroxyl groups originally present in the polyhydric alcohol, is treated with ammonia and hydrogen at a temperature of 150–275° C. and a pressure of 500–5000 p.s.i.g. over a catalyst prepared by the reduction of a mixture of the oxides of nickel, copper and chromium, the proportion of metals to each other, calculated on an oxide-free basis, being 60–85 mol percent nickel, 14–37 mol percent copper and 1–5 mol percent chromium. Preferred polyols useful in the process are obtained by the addition of ethylene oxide, propylene oxide or mixtures thereof to ethylene glycol, propylene glycol, glycerine or trimethylolpropane provided the terminating oxide of the polyol is propylene oxide.

The amines obtained by our process are primarily useful as curing agents for epoxy resins. They may also find application as plasticizers, as cross-linking agents and binders for textiles and as intermediates in the preparation of polyureas. By proper choice of the particular alkylene oxide and the amount of oxide, the solubility characteristics of the amines may be varied over a wide range to fit the needs of a particular application.

DESCRIPTION OF THE PREFERRED EMBODIMENT

The catalyst for use in the process is one containing nickel, copper and chromium. Such a catalyst is described, for example, in U.S. Pat. 3,152,998. The catalyst is prepared by the reduction of a mixture of the oxides of nickel, copper and chromium in the presence of hydrogen at a temperature within the range of about 250° to 400° C. Calculated on an oxide-free basis, the catalyst contains 60–85 mol percent nickel, 14–37 mol percent copper and 1–5 mol percent chromium. A particularly preferred catalyst composition is one containing 70–80 mol percent nickel, 20–25 mol percent copper and 1–5 mol percent chromium.

My process is conducted at a temperature within the range of from about 150° to 275° C. with a preferred range being from 200° to 250° C. The pressure may be varied from 500–5000 p.s.i.g. with the preferred range being 2000–4000 p.s.i.g. The process may be conducted with or without a solvent. Solvents that may be employed include water and inert hydrocarbons such as heptane and cyclohexane. A preferred solvent is liquid ammonia which can be present in a 10–40 mol excess with a 20–30 mol excess being preferred. It is convenient to use ammonia as a solvent since ammonia is necessary to the reaction.

The process may be conducted batchwise, as is done with prior art processes using Raney nickel catalyst, or it may be conducted continuously. Continuous operation is preferred, since, in general, batch processes are slow and require filtration to remove the catalyst.

The polyoxyalkylene polyol starting material of our process may be depicted by the formula:

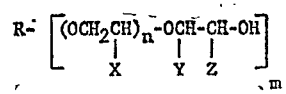

wherein R is the nucleus of an oxyalkylation-susceptible polyhydric alcohol containing 2–12 carbon atoms and 2–8 hydroxyl groups, Z is an alkyl group containing 1–18 carbon atoms, X and Y are hydrogen or Z, $n$ has an average value of 0–50 and $m$ is an integer of 2–8 corresponding to the number of hydroxyl groups in the polyhydric alcohol. It can be seen that in the above formula if R is a 1,2-propylene radical, Y is hydrogen, X and Z are methyl, $n$ is one or more and $m$ is two, the products are those of U.S. Pat. 3,236,895. However, if $n$ is zero, the product is the diamine prepared from tripropylene glycol and is thus a lower molecular weight diamine than those that can be obtained by the processes of U.S. Pat. 3,236,895.

If the polyoxyalkylene polyol contains three or more hydroxyl groups, novel polyamines result. These may be complex mixtures as described hereinbelow. First, it is to be understood that each polyoxyalkylene chain in the molecule does not necessarily contain the same number of oxyalkylene groups as every other polyoxyalkylene chain in the molecule. Thus, in the above formula, the value of $n$ is merely an average value. Further, reaction of certain of the polyols with ammonia results in the formation of nitrogen-containing heterocyclic compounds.

For example, the three-mol propylene oxide adduct of glycerine will contain a number of compounds, including the following:

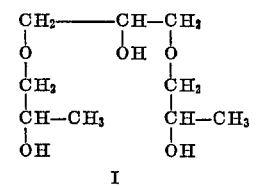
I

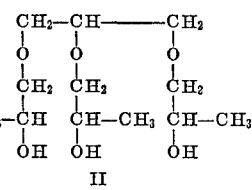
II

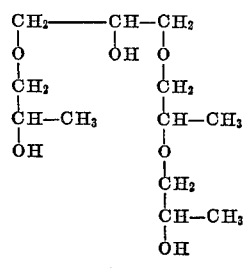
III

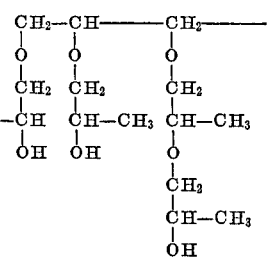
IV

Reaction of compounds II and IV with ammonia will result in the formation of the corresponding triamine from each. However, reaction of compounds I and III with ammonia will lead to substituted morpholines as illustrated by the following compound which will result from I.

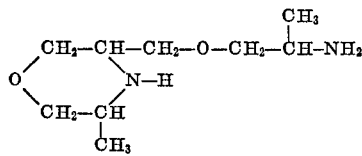

Thus, it can be seen that the treatment of the three-mol propylene oxide adduct of glycerine by our process results in a complex mixture of polyamines.

The polyoxyalkylene polyol starting materials for our process are well known in the art. Such polyols are obtained by the addition of alkylene oxides to polyhydric aliphatic alcohols containing 2–12 carbon atoms and 2–8 hydroxyl groups. Examples of such polyhydric alcohols include ethylene glycol, propylene glycol, glycerine, trimethylolpropane, trimethylolethane, hexanetriol, triethanolamine, pentaerythritol, methyl glucoside, xylitol, inositol, sorbitol, mannitol and sucrose.

To the aliphatic polyhydric alcohol is added one or more alkylene oxides employing known oxyalkylation procedures as taught, for example, in U.S. Pat. 3,000,963 (1961) to George P. Speranza. The polyoxyalkylene starting materials are prepared by reacting propylene oxide with a suitable initiator under oxyalkylation conditions. The initiator or charge material in such a reaction either for polymer or adduct formation is, in general, a hydroxyl containing aliphatic organic compound composed entirely of the atoms, carbon, hydrogen and oxygen and selected from monohydric alcohols, glycols, polyglycols and triols. The adducts may be prepared by reacting ethylene oxide, propylene oxide or mixtures thereof with a hydroxyl-containing compound, for example, ethylene glycol, propylene glycol, glycerine or trimethylolpropane, provided the terminating oxide is propylene oxide. In general, polyol formation with propylene oxide is effected by contacting the initiator with propylene oxide at an elevated temperature in the range of 80°–150° C. under a moderately elevated pressure, and in the presence of an alkaline-reacting material or catalyst. Alkaline bodies suitable for effecting this reaction include sodium and potassium hydroxide and the corresponding hydrides and alkoxides. On completion of the oxyalkylation reaction, the crude reaction product containing the alkaline-reacting material is normally treated with an inorganic acid or acid-forming material to neutralize the alkaline bodies remaining in the reaction product after which it is filtered to produce a finished product. If oxyalkylene chains containing more than one oxyalkylene group are desired, the alkylene oxide used is preferably a terminal alkylene oxide having the formula:

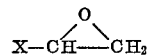

wherein X is hydrogen or an alkyl group containing 1–18 carbon atoms. Examples of such oxides include ethylene oxide, propylene oxide, butene-1 oxide, dodecene-1 oxide and octadecene-1 oxide.

The terminal hydroxyl groups of the polyoxyalkylene polyol should preferably be secondary hydroxyl groups in order to get the best yield of primary amine. For this reason, the polyoxyalkylene chains should be terminated with at least one mol of propylene oxide.

Preferred polyoxyalkylene polyols for use in our process are tripropylene glycol and propylene oxide adducts of glycerine, especially those containing an average of 1–10 oxypropylene groups for each hydroxyl group.

Our process will be further illustrated by the following examples.

EXAMPLE I

The reaction was carried out in a continuous reactor which was a stainless steel tube of 1¼ inch inside diameter and 27 inches in length. The reactor contained 487 ml. of a prereduced, pelleted nickel-copper-chromium catalyst containing 75 mol percent nickel, 23 mol percent copper and 2 mol percent chromium. Into the reactor were metered 160 l. per hour (measured at 0° C. and 1 atmosphere) of hydrogen, 0.32 pound per hour of ammonia and 0.74 pound per hour of a 50% solution of a polypropylene glycol of an average molecular weight of about 400 average molecular weight in water. The reactor was operated at 250° C., 3000 p.s.i.g. pressure and a space velocity of 1.0 g. of total liquid feed per ml. of catalyst per hour. The reactor effluent was stripped of ammonia and water at 150° C. and 50 mm. pressure. The product was a colorless liquid having 83.4% amino groups and 16.6% unreacted hydroxyl groups based on the original concentration of hydroxyl groups.

EXAMPLE II

The procedure employed was essentially the same as in Example I using 160 l. per hour of hydrogen, 0.39 pound per hour of ammonia and 0.67 pound per hour of a 50% solution of polypropylene glycol of an average molecular weight of about 400 molecular weight in cyclohexane. The reactor was operated at 240° C. and 3000 p.s.i.g. The reactor effluent was stripped of ammonia and cyclohexane by heating to 150° C. under 5 mm. pressure. The product was a colorless liquid having 93.2% amino groups, 4.2% hydroxyl groups and 2.6% of the hydroxyl groups lost through hydrogenolysis. The amino groups were approximately 95% primary and 5% secondary and tertiary.

EXAMPLE III

In this example the feed to the reactor of Example I consisted of 160 l. per hour of hydrogen, 0.22 pound per hour of ammonia and 0.84 pound per hour of a 50% solution of polypropylene glycol of an average molecular weight of about 1000 molecular weight in cyclohexane. The reactor was operated at 250° C. and 3000 p.s.i.g.

The reactor effluent was stripped of ammonia and cyclohexane by heating to 150° C. under 5 mm. pressure. The colorless product remaining was a liquid having 87.0% of the original hydroxyl groups converted into amino groups, 11.6% unchanged hydroxyl groups and 1.4% hydroxyl groups lost through hydrogenolysis.

EXAMPLE IV

The feed to the reactor was 159 l. per hour of hydrogen, 0.68 pound per hour of ammonia and 0.38 pound per hour of tripropylene glycol. The reactor was operated at 225° C. and 3000 p.s.i.g. The crude effluent from a run in which 323 g. of tripropylene glycol was passed through the reactor was distilled to yield 163 g. of 1,8-diamino-1,5,8-trimethyl-3,6-dioxaoctane, boiling point 150–155° C. at 50 mm. pressure. The yield was 51% of theory.

EXAMPLE V

To the reactor operated at 225° C. and 3000 p.s.i.g. were fed 159 l. per hour of hydrogen, 1.16 pounds per hour of ammonia and 0.45 pound per hour of tripropylene glycol. During this run 5.15 kg. of tripropylene glycol was passed through the reactor. Upon distillation of the crude reactor effluent, 2825 g. of the diamine of Example IV was obtained (55.5% yield). In addition there were obtained 917 g. of a mixture of unreacted tripropylene glycol and the monoamine from partial amination of tripropylene glycol and 699 g. of a residue fraction. The yield of diamine based on completely converted tripropylene glycol was 67%. The diamine was 99% pure by a chromatographic analysis.

EXAMPLE VI

To the reactor described in Example I were metered 159 l. per hour of hydrogen, 0.77 pound per hour of ammonia and 0.29 pound per hour of tripropylene glycol at 215° C. and 3000 p.s.i.g. During the run a total of 8.98 kg. of tripropylene glycol was passed through the reactor. Distillation of the reactor effluent gave 1078 g. of a crude material, B.P. 159–170° C. (50 mm.) after removal of the diamine. Redistillation of the crude fraction gave 458 g. of the monoamine, B.P. 138–139° C. (15 mm.), from partial amination of tripropylene glycol.

EXAMPLE VII

Example VI was repeated using 790 g. of tripropylene glycol. After removal of the diamine, the monoamine and unreacted glycol there was obtained 41 g. of a triamine having the structure

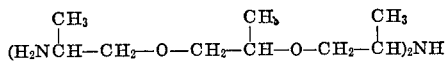

The triamine had a boiling range of 169–175° C. at 1.5 mm. The structure was confirmed by infrared and nuclear magnetic resonance.

EXAMPLE VIII

The continuous reactor employed in this example consisted of stainless steel pipe one inch in diameter and 103 inches long. The reactor contained 1000 ml. of the catalyst described in Example I. To this reactor were fed 6 ft.³ per hour of hydrogen, 2.8 pounds per hour of ammonia and 3.03 pounds per hour of a polypropylene glycol of an average molecular weight of about 1000 molecular weight. The reactor was maintained at 235–236° C. and 3000 p.s.i.g. The reactor effluent was freed of ammonia and water by vacuum stripping. The colorless, viscous oil remaining had the following analysis:

|   | Meq./g. |
|---|---|
| Total acetylatables | 2.08 |
| Total amines | 2.00 |
| Primary amines | 1.93 |

EXAMPLE IX

To the reactor of Example VIII were fed 6 ft.³ per hour of hydrogen, 4.85 pounds per hour of ammonia and 2.32 pounds per hour of a propylene oxide adduct of glycerine having an average molecular weight of about 260. The reactor was maintained at 215° C. and 3000 p.s.i.g. The reactor effluent was stripped to 160° C. at 40 mm. to remove water and ammonia. The colorless, viscous oil remaining had the following analysis:

|   | Meq./g. |
|---|---|
| Total acetylatables | 8.98 |
| Total amines | 8.64 |
| Primary amines | 6.98 |
| Tertiary amines | 0.15 |
| Secondary amines | 1.51 |

Fractional distillation of the mixture separated four major components which were purified by redistillation. These four novel compounds, their boiling points and the yield of each are shown below.

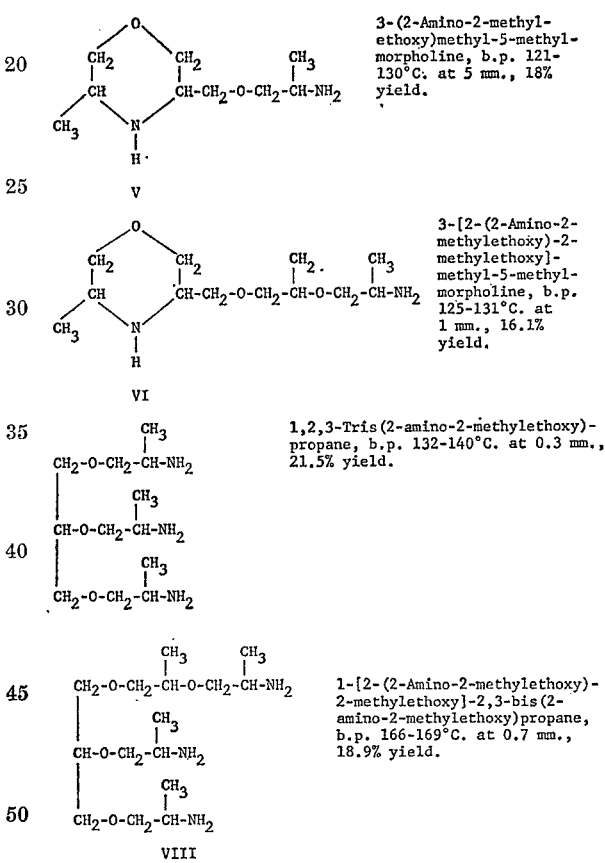

EXAMPLE X

To the reactor of Example VIII were fed 6 ft.³ per hour of hydrogen, 3.25 pounds per hour of ammonia and 3.30 pounds per hour of a propylene oxide adduct of glycerine having an average molecular weight of about 1500, while the reactor was maintained at 244–246° C. and 3000 p.s.i.g. After vacuum stripping to remove water and ammonia, the colorless product had the following analysis:

|   | Meq./g. |
|---|---|
| Total acetylatables | 2.16 |
| Total amines | 2.06 |
| Primary amines | 1.95 |

EXAMPLE XI

To the reactor of Example VIII maintained at 220° C. and 2500 p.s.i.g. were fed 6 ft.³ per hour of hydrogen, 1.7 pounds per hour of ammonia and 1.24 pounds per hour of a mixed ethylene oxide-propylene oxide polymer having an average molecular weight of 912. The mixed polymer was obtained by the addition of propylene oxide to a polyethylene glycol having an average molecular weight of about 700. The reactor effluent was freed of water and ammonia at 150° C. and 25 mm. leaving a pale yellow liquid which partially solidified upon standing at room temperature. The product had the following analysis:

|  | Meq./g. |
|---|---|
| Total acetylatables | 2.15 |
| Total amines | 2.02 |
| Primary amines | 1.78 |

Particularly desirable amines of my invention are the diamine obtained from tripropylene glycol and the polyamines obtained from propylene oxide adducts of glycerine, especially those containing an average of 1–10 oxypropylene groups attached to each hydroxyl group of glycerine.

What is claimed is:

1. A method for preparing polyoxyalkylene polyamines which comprises:

reacting a polyoxyalkylene polyol with hydrogen and ammonia at 150–275° C. and 500–5000 p.s.i.g. in the presence of a catalyst prepared by the reduction of a mixture of oxides of nickel, copper and chromium, the proportion of metals to each other, calculated on an oxide-free basis, being 60–85 mol percent nickel, 14–37 mol percent copper and 1–5 mol percent chromium, and the polyoxyalkylene polyol is obtained by the addition of ethylene oxide, propylene oxide or mixtures thereof to ethylene glycol, propylene glycol, glycerine or trimethylolpropane provided the terminating oxide is propylene oxide.

2. A method of claim 1 wherein the catalyst contains 70–80 mol percent nickel, 20–25 mol percent copper and 1–5 mol percent chromium.

3. A method as in claim 1 wherein the polyoxyalkylene polyol is tripropylene glycol.

4. A method as in claim 1 wherein the polyoxyalkylene polyol is a polypropylene glycol having an average molecular weight of about 400 molecular weight.

5. A method as in claim 1 wherein the polyoxyalkylene polyol is a polypropylene glycol having an average molecular weight of about 1000 molecular weight.

6. A method as in claim 1 wherein the polyoxyalkylene polyol is a propylene oxide adduct of glycerine having an average molecular weight of about 260.

7. A method as in claim 1 wherein the polyoxyalkylene polyol is a propylene oxide adduct of glycerine having an average molecular weight of about 1500.

8. A method as in claim 1 wherein the polyoxyalkylene polyol is a propylene oxide adduct of polyethylene glycol having an average molecular weight of about 700.

References Cited
UNITED STATES PATENTS

| 3,390,184 | 6/1968 | Moss et al. | 260—585 B |
| 2,923,696 | 2/1960 | Harwell et al. | 260—585 BX |
| 3,347,926 | 10/1967 | Zech | 260—585 B |
| 3,373,204 | 3/1968 | Hales et al. | 260—584 BX |
| 3,269,999 | 8/1966 | Moore et al. | 260—585 BX |
| 3,383,417 | 5/1968 | Lichtenwalter | 260—585 BX |

JOSEPH REBOLD, Primary Examiner

R. L. RAYMOND, Assistant Examiner

U.S. Cl. X.R.

260—247.5 R, 585 B